US007942442B2

(12) United States Patent
Rose et al.

(10) Patent No.: US 7,942,442 B2
(45) Date of Patent: *May 17, 2011

(54) AIRBAG CUSHION FOLDING METHODS

(75) Inventors: Larry D. Rose, South Weber, UT (US);
Marc P. Russell, Plain City, UT (US);
Jeffrey D. Williams, Roy, UT (US);
Ralph Tree, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/259,221

(22) Filed: Oct. 27, 2008

(65) Prior Publication Data

US 2009/0102173 A1    Apr. 23, 2009

Related U.S. Application Data

(63) Continuation-in-part of application No. 11/115,928, filed on Apr. 27, 2005, now Pat. No. 7,441,804.

(51) Int. Cl.
*B60R 21/237* (2006.01)
(52) U.S. Cl. .................................................. 280/743.1
(58) Field of Classification Search ............... 280/743.1, 280/729, 728.1
See application file for complete search history.

(56) References Cited

U.S. PATENT DOCUMENTS

| 3,748,477 | A | | 7/1973 | Wulbrecht |
| 4,235,453 | A | | 11/1980 | Lawson et al. |
| 4,286,954 | A | | 9/1981 | McArthur et al. |
| 4,351,544 | A | * | 9/1982 | Ross .......................... 280/743.1 |
| 4,842,300 | A | * | 6/1989 | Ziomek et al. ................. 280/732 |
| 5,004,266 | A | * | 4/1991 | Miller et al. ................ 280/743.2 |
| 5,022,675 | A | | 6/1991 | Zelenak et al. |
| 5,140,799 | A | * | 8/1992 | Satoh .............................. 53/429 |
| 5,178,407 | A | | 1/1993 | Kelley |
| 5,240,282 | A | | 8/1993 | Wehner et al. |
| 5,246,250 | A | | 9/1993 | Wolanin et al. |
| 5,290,061 | A | * | 3/1994 | Bollaert ..................... 280/743.1 |

(Continued)

FOREIGN PATENT DOCUMENTS

JP        06255437 A    9/1994

(Continued)

OTHER PUBLICATIONS

International Search Report/Written Opinion from PCT International Application No. PCT/US2008/052201 dated Aug. 1, 2008, now published as WO 2008/109202.

*Primary Examiner* — Paul N Dickson
*Assistant Examiner* — Timothy D Wilhelm
(74) *Attorney, Agent, or Firm* — Sally J. Brown; Stoel Rives LLP

(57) ABSTRACT

The methods for folding an airbag cushion into a housing provide for a predetermined deployment trajectory. The airbag cushion is defined by an upper panel and a lower panel. A first portion of the airbag cushion is tucked into a second portion of the airbag cushion such that the upper and lower panels of the first portion are positioned in between the upper and lower panels of the second portion. The tucked portion is folded in towards the housing. First and second halves of the tucked airbag cushion are folded in towards the housing. Finally, the folded first and second halves of the airbag cushion are folded into the housing.

22 Claims, 9 Drawing Sheets

U.S. PATENT DOCUMENTS

| | | | |
|---|---|---|---|
| 5,310,216 A * | 5/1994 | Wehner et al. | 280/743.1 |
| 5,346,248 A | 9/1994 | Rhein et al. | |
| 5,398,968 A * | 3/1995 | Emambakhsh et al. | 280/743.1 |
| 5,407,227 A | 4/1995 | Lauritzen et al. | |
| 5,419,579 A * | 5/1995 | McPherson et al. | 280/743.1 |
| 5,425,551 A | 6/1995 | Hawthorn | |
| 5,447,329 A | 9/1995 | Hamada | |
| 5,452,913 A | 9/1995 | Hansen | |
| 5,454,595 A * | 10/1995 | Olson et al. | 280/743.1 |
| 5,492,363 A | 2/1996 | Hartmeyer et al. | |
| 5,496,056 A | 3/1996 | Dyer | |
| 5,531,477 A | 7/1996 | Madrigal et al. | |
| 5,538,281 A * | 7/1996 | Patercsak | 280/743.1 |
| 5,570,905 A | 11/1996 | Dyer | |
| 5,588,674 A | 12/1996 | Yoshimura et al. | |
| 5,613,698 A | 3/1997 | Patercsak et al. | |
| 5,630,614 A | 5/1997 | Conlee | |
| 5,694,737 A * | 12/1997 | Lunt et al. | 53/119 |
| 5,732,973 A * | 3/1998 | Turnbull et al. | 280/743.1 |
| 5,755,459 A | 5/1998 | LaLonde | |
| 5,765,867 A | 6/1998 | French | |
| 5,772,239 A | 6/1998 | Seymour | |
| 5,823,567 A * | 10/1998 | Behr et al. | 280/743.1 |
| 5,899,495 A * | 5/1999 | Yamamoto et al. | 280/743.1 |
| 5,957,486 A | 9/1999 | Taguchi et al. | |
| 5,979,937 A * | 11/1999 | Yoshida et al. | 280/743.2 |
| 6,029,996 A | 2/2000 | Yoshioka et al. | |
| 6,056,318 A | 5/2000 | Braunschadel | |
| 6,110,094 A * | 8/2000 | Wallentin et al. | 493/454 |
| 6,131,944 A | 10/2000 | Henkel et al. | |
| 6,142,517 A * | 11/2000 | Nakamura et al. | 280/739 |
| 6,155,598 A * | 12/2000 | Kutchey | 280/730.2 |
| 6,186,544 B1 | 2/2001 | Igawa | |
| 6,196,585 B1 | 3/2001 | Igawa | |
| 6,203,062 B1 * | 3/2001 | Kusaka et al. | 280/743.1 |
| 6,286,866 B1 | 9/2001 | Satge et al. | |
| 6,299,202 B1 | 10/2001 | Okada et al. | |
| 6,352,283 B1 * | 3/2002 | Ellerbrok et al. | 280/743.1 |
| 6,371,510 B1 | 4/2002 | Marriott et al. | |
| 6,390,500 B1 * | 5/2002 | Yamada et al. | 280/743.1 |
| 6,398,258 B2 | 6/2002 | Hamada et al. | |
| 6,432,033 B1 * | 8/2002 | Salzmann et al. | 493/231 |
| 6,474,686 B1 | 11/2002 | Higuchi et al. | |
| 6,499,765 B2 | 12/2002 | Hawthorn et al. | |
| 6,557,891 B2 | 5/2003 | Okada et al. | |
| 6,619,691 B1 | 9/2003 | Igawa | |
| 6,669,229 B2 | 12/2003 | Thomas | |
| 6,682,093 B2 | 1/2004 | Tajima et al. | |
| 6,692,024 B2 * | 2/2004 | Fischer et al. | 280/743.1 |
| 6,739,622 B2 | 5/2004 | Halford et al. | |
| 6,767,030 B2 | 7/2004 | Yamaji et al. | |
| 6,830,266 B2 | 12/2004 | Abe | |
| 6,832,779 B2 * | 12/2004 | Tajima et al. | 280/743.1 |
| 6,874,810 B2 | 4/2005 | Soderquist | |
| 6,877,772 B2 | 4/2005 | Fischer et al. | |
| 6,883,381 B2 | 4/2005 | Kolb et al. | |
| 6,883,831 B2 | 4/2005 | Hawthorn et al. | |
| 6,887,772 B2 | 5/2005 | Fischer et al. | |
| 6,942,242 B2 | 9/2005 | Hawthorn et al. | |
| 6,945,562 B2 | 9/2005 | Abe | |
| 6,955,377 B2 | 10/2005 | Cooper et al. | |
| 6,971,671 B2 | 12/2005 | Schneider et al. | |
| 6,988,743 B2 * | 1/2006 | Okamoto et al. | 280/743.1 |
| 7,083,191 B2 | 8/2006 | Fischer | |
| 7,150,470 B2 | 12/2006 | Okada et al. | |
| 7,223,224 B2 | 5/2007 | Card et al. | |
| 7,232,153 B2 | 6/2007 | Kawauchimaru et al. | |
| 7,237,802 B2 | 7/2007 | Rose et al. | |
| 7,293,795 B2 | 11/2007 | Kong | |
| 7,347,450 B2 | 3/2008 | Williams et al. | |
| 7,404,570 B2 | 7/2008 | Miyata | |
| 7,441,804 B2 | 10/2008 | Rose et al. | |
| 7,441,805 B2 * | 10/2008 | Jamison et al. | 280/743.2 |
| 7,445,239 B2 | 11/2008 | Okada et al. | |
| 7,481,455 B2 | 1/2009 | Iida et al. | |
| 7,530,597 B2 | 5/2009 | Bito | |
| 7,735,862 B2 | 6/2010 | Choi | |
| 7,845,682 B2 | 12/2010 | Lachat et al. | |
| 2002/0020990 A1 | 2/2002 | Sinnhuber et al. | |
| 2003/0001366 A1 | 1/2003 | Debler et al. | |
| 2003/0189319 A1 | 10/2003 | Soderquist | |
| 2003/0234520 A1 | 12/2003 | Hawthorn et al. | |
| 2004/0251669 A1 | 12/2004 | Fischer et al. | |
| 2005/0134032 A1 * | 6/2005 | Downing et al. | 280/743.1 |
| 2006/0012157 A1 | 1/2006 | Ishiguro et al. | |
| 2006/0131847 A1 * | 6/2006 | Sato et al. | 280/730.2 |
| 2007/0052221 A1 | 3/2007 | Okada et al. | |
| 2007/0057057 A1 | 3/2007 | Kim | |
| 2007/0120346 A1 | 5/2007 | Kwon | |
| 2007/0126219 A1 | 6/2007 | Williams | |
| 2007/0138779 A1 | 6/2007 | Kwon | |
| 2007/0170710 A1 | 7/2007 | Bouquier | |
| 2007/0278772 A1 | 12/2007 | Burghardt et al. | |
| 2008/0023950 A1 | 1/2008 | Kalczynski et al. | |
| 2008/0203713 A1 | 8/2008 | McFadden et al. | |
| 2008/0217887 A1 | 9/2008 | Seymour et al. | |
| 2008/0217892 A1 | 9/2008 | Maripudi | |
| 2008/0284140 A1 | 11/2008 | Choi | |
| 2009/0039630 A1 | 2/2009 | Schneider et al. | |
| 2009/0102173 A1 | 4/2009 | Rose et al. | |
| 2009/0108574 A1 | 4/2009 | Lachat et al. | |
| 2009/0152842 A1 | 6/2009 | Benny et al. | |
| 2009/0256340 A1 | 10/2009 | Williams et al. | |

FOREIGN PATENT DOCUMENTS

| | | |
|---|---|---|
| JP | 2005 343267 | 12/2005 |
| WO | WO 2008/109202 | 9/2008 |

* cited by examiner

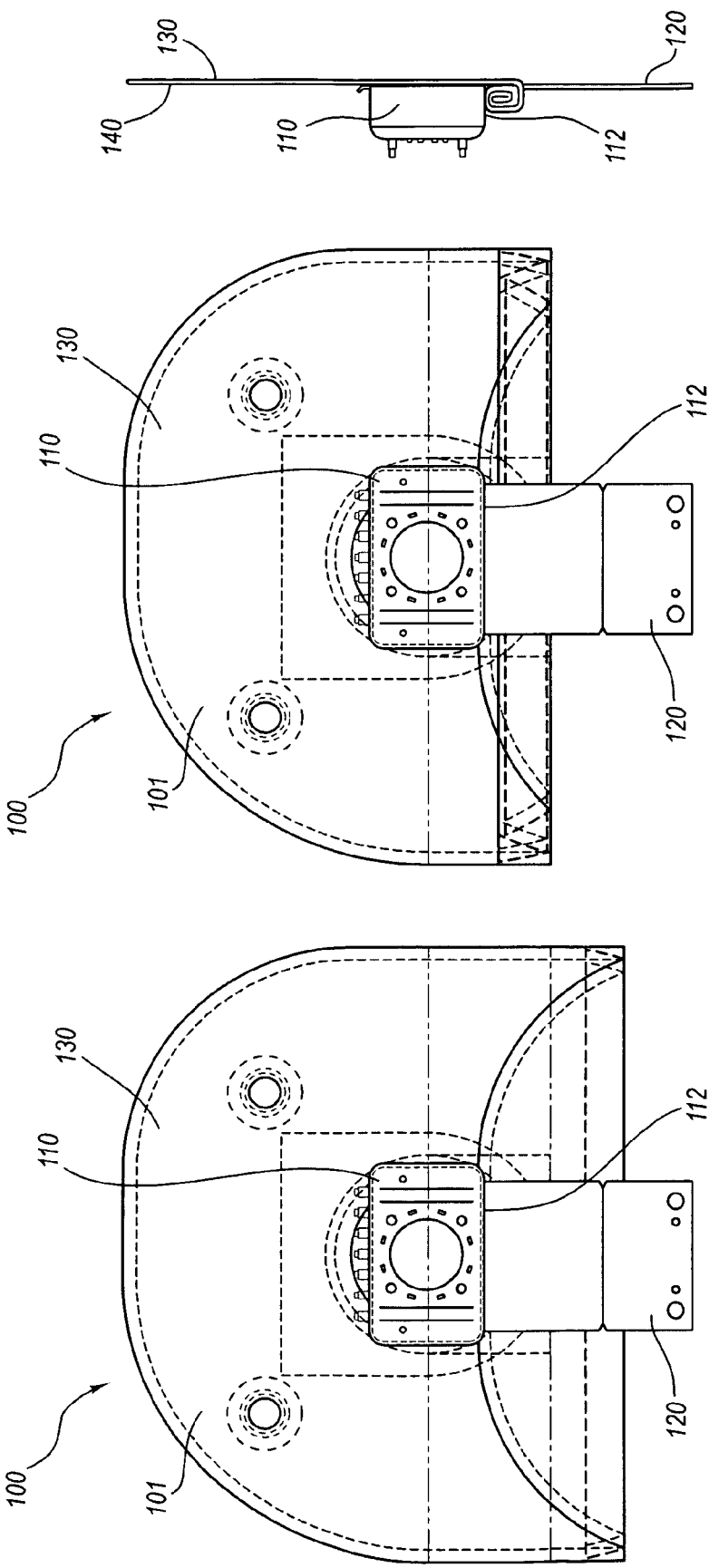

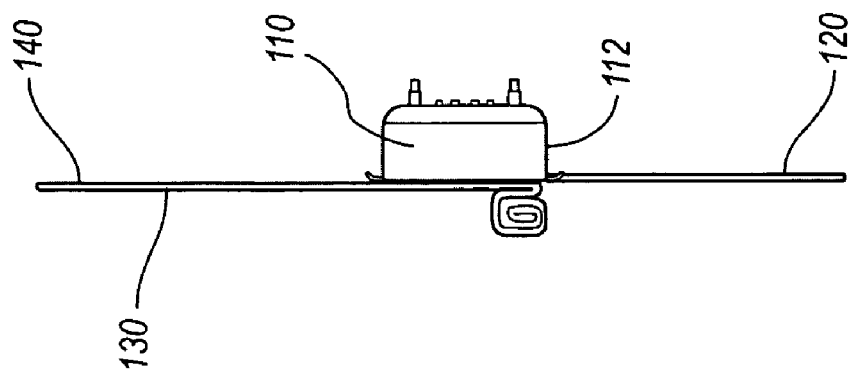
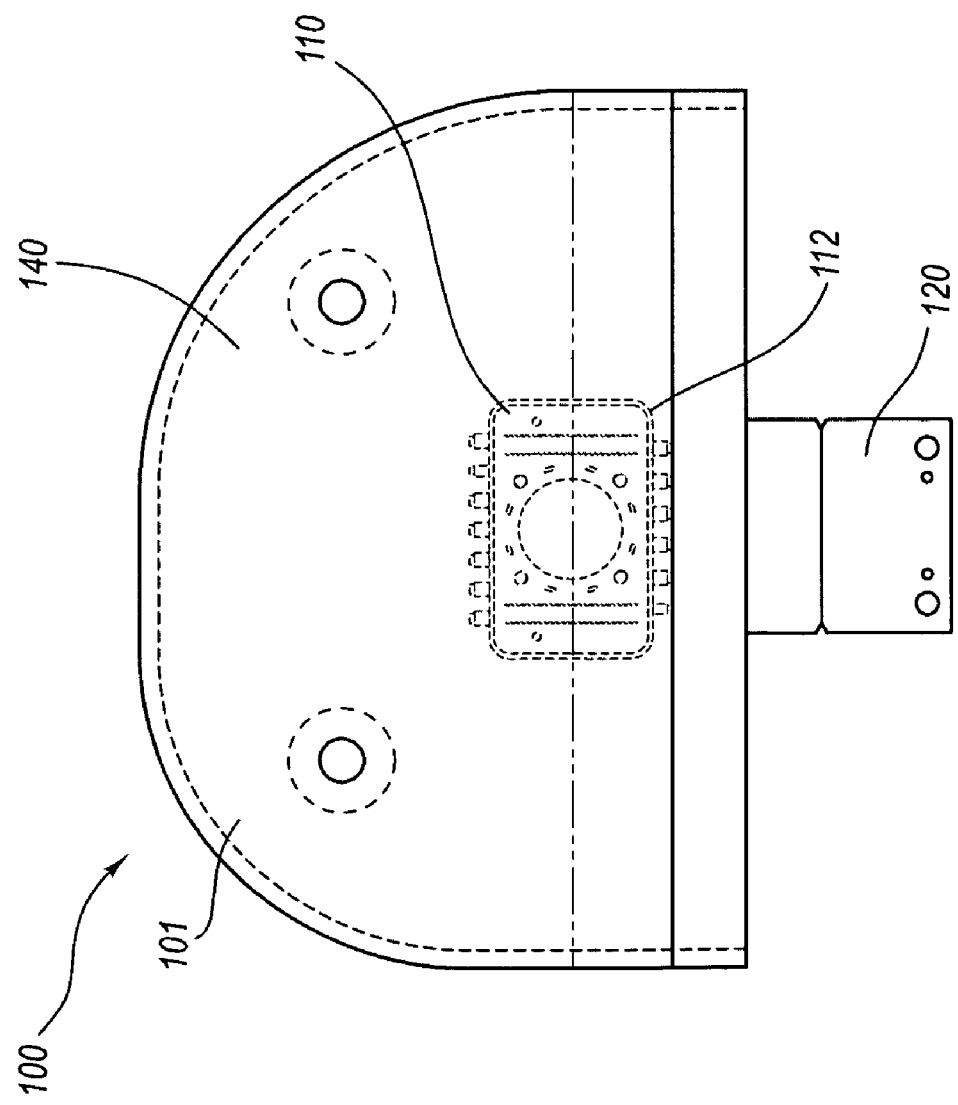
Fig. 6
Fig. 5

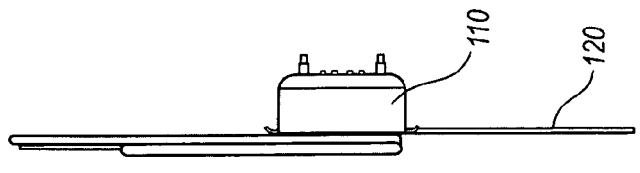
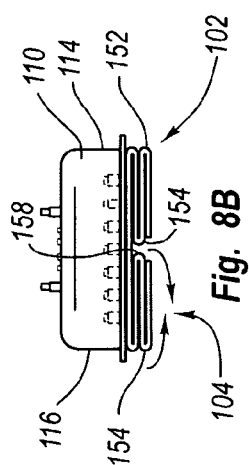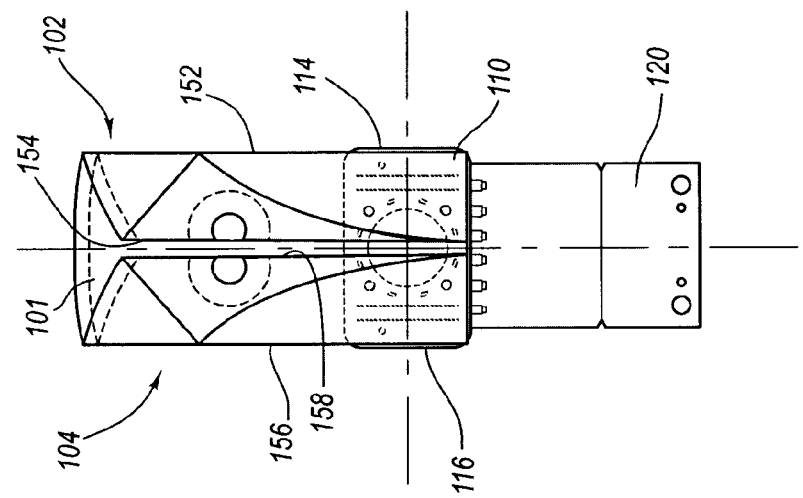
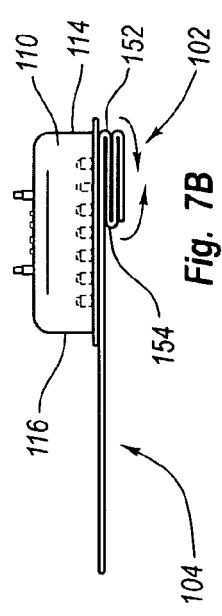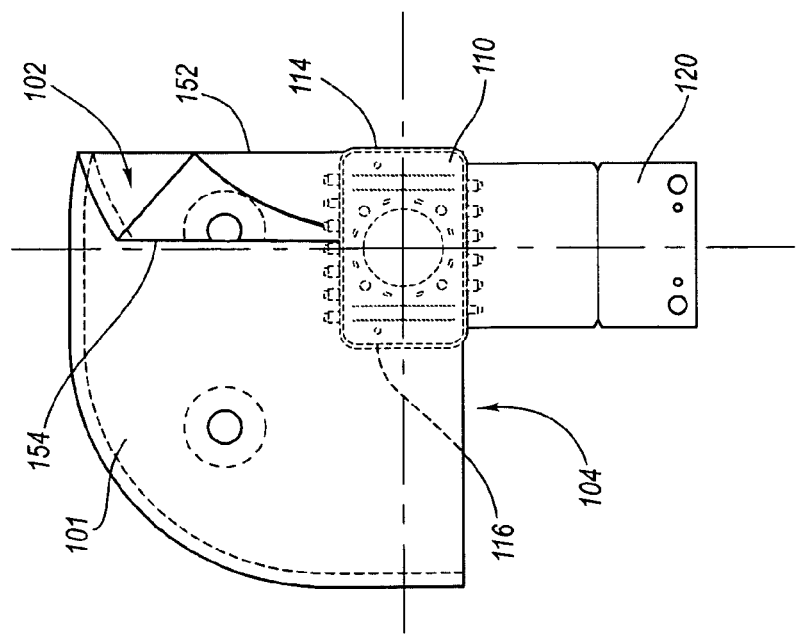

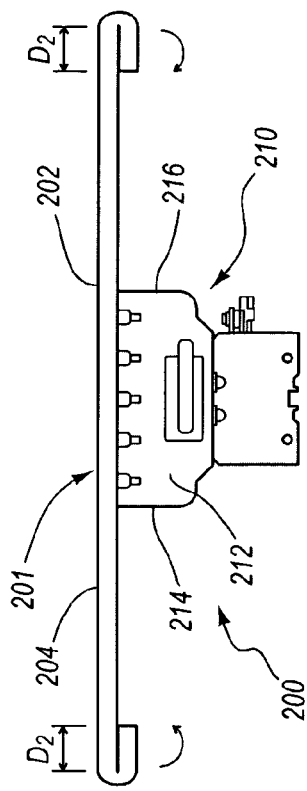
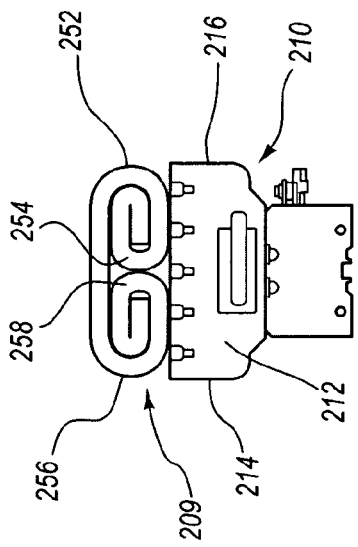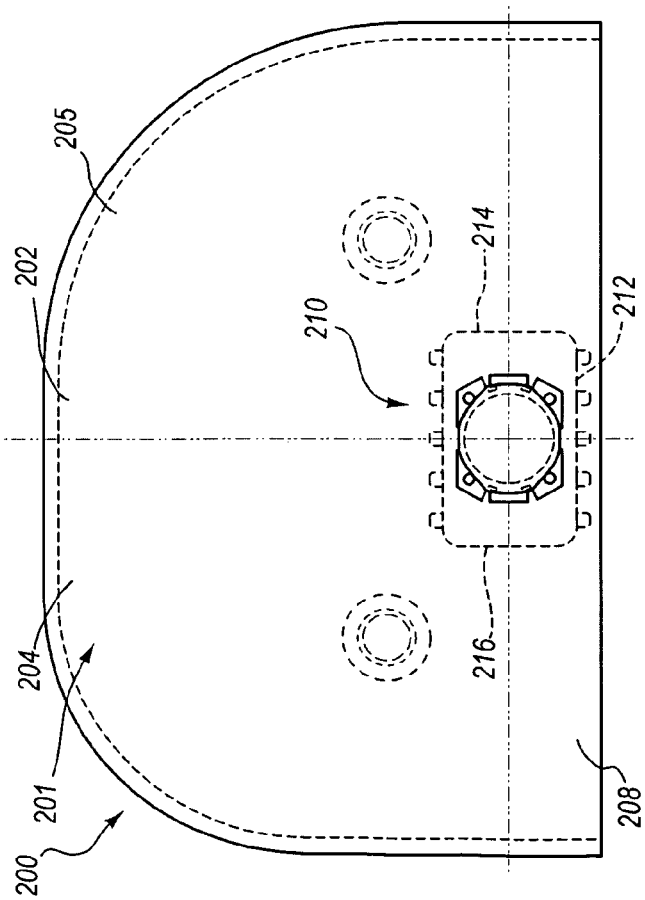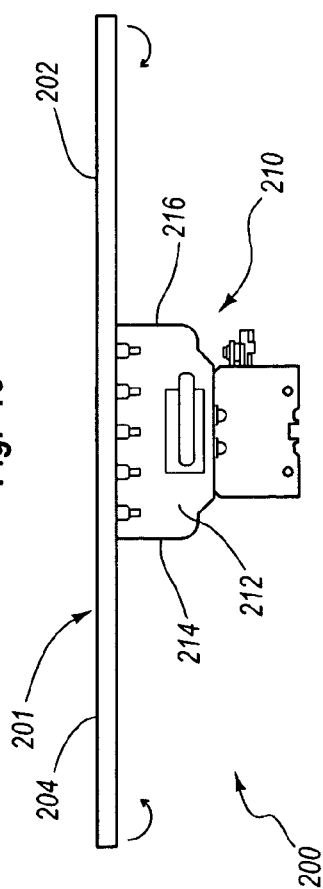

US 7,942,442 B2

AIRBAG CUSHION FOLDING METHODS

RELATED APPLICATIONS

The present application is a continuation-in-part of prior U.S. patent application Ser. No. 11/115,928, titled AIRBAG CUSHION FOLDING METHODS, filed on Apr. 27, 2005, the entire contents of which are hereby incorporated herein by reference.

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings.

FIG. 3 is a top plan view of the airbag cushion assembly after a first fold has been applied to the tucked portion.

FIG. 4A is a top plan view of the airbag cushion assembly after additional folds have been applied to the tucked portion, such that one side of the folded tucked portion is at least approximately even with one side of the housing.

FIG. 4B is a side elevation view of the airbag cushion assembly at the same stage of the folding method as shown in FIG. 4A.

FIG. 5 is a top plan view of the airbag cushion assembly after it has been turned over such that the housing is underneath the airbag cushion.

FIG. 6 is a side elevation view of the airbag cushion assembly after the folded portion has been folded over the housing opening.

FIG. 7A is a top plan view of the airbag cushion assembly after a first half of the airbag cushion has been folded until one side of the folded first half is approximately even with a side of the housing.

FIG. 7B is a top elevation view of the airbag cushion assembly at the same stage of the folding method as shown in FIG. 7A.

FIG. 8A is a top plan view of the airbag cushion assembly after a second half of the airbag cushion has been folded until one side of the folded second half is approximately even with a side of the housing.

FIG. 8B is a top elevation view of the airbag cushion assembly at the same stage of the folding method as shown in FIG. 8A.

FIG. 8C is a side elevation view of the airbag cushion assembly at the same stage of the folding method as shown in FIGS. 8A and 8B.

FIG. 13 is a top plan view of the airbag cushion assembly of FIG. 12C.

FIG. 14A is a front elevation view of the airbag cushion of assembly of FIG. 13.

FIG. 14B is a front elevation view of the airbag cushion of assembly of FIG. 14A after a portion of the airbag cushion has been partially rolled.

FIG. 14C is a front elevation view of the airbag cushion of assembly of FIG. 14B after a portion of the airbag cushion has been rolled.

DETAILED DESCRIPTION OF PREFERRED EMBODIMENTS

Described below are embodiments of methods for folding automotive airbags. In the following description, numerous specific details are provided for a thorough understanding of the embodiments of the invention. However, those skilled in the art will recognize that the invention can be practiced without one or more of the specific details, or with other methods, components, materials, etc.

In addition, in some cases, well-known structures, materials, or operations are not shown or described in detail in order to avoid obscuring aspects of the invention. Furthermore, the described features, structures, steps, or characteristics may be combined in any suitable manner in one or more embodiments.

In one implementation of the inventive method, an airbag cushion defined by an upper panel and a lower panel is provided. A first portion of the airbag cushion is tucked into a second portion of the airbag cushion such that the upper and lower panels of the first portion are positioned in between the upper and lower panels of the second portion. The tucked portion is folded in towards the housing. First and second halves of the tucked airbag cushion are folded in towards the housing from opposite directions. Finally, the folded first and second halves of the airbag cushion are folded into the housing.

Figure 1:
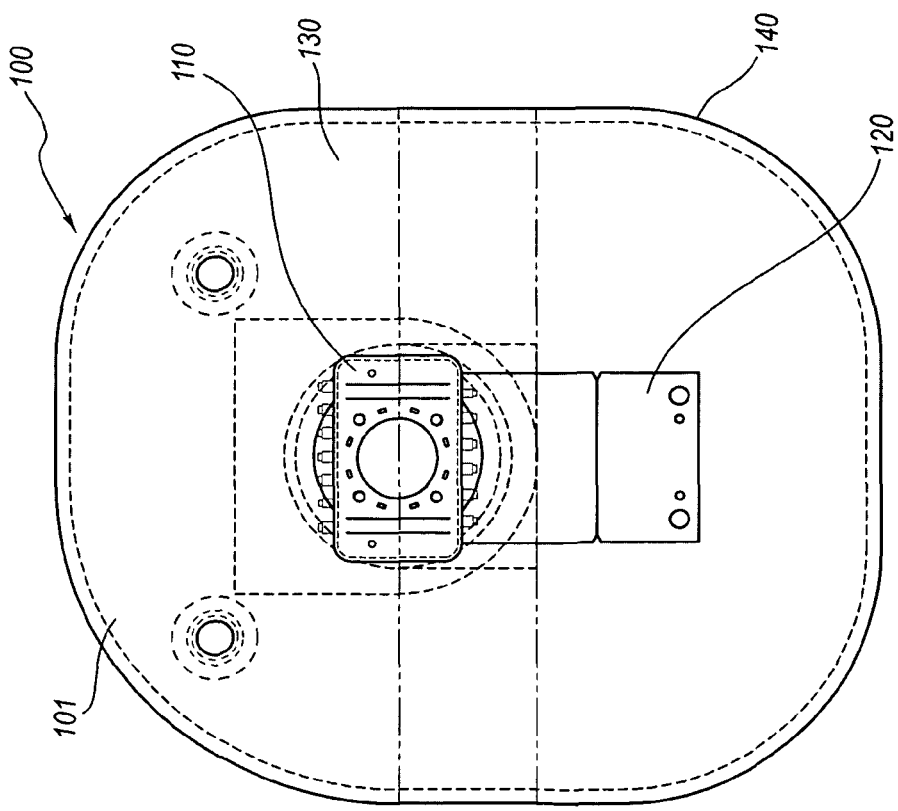
FIG. 1 is a top plan view of an embodiment of an airbag cushion assembly.

With reference now to the accompanying figures, an example of a method according to the invention will be described in greater detail. FIG. 1 depicts an airbag cushion assembly 100, which may comprise an airbag cushion membrane 101 that is attached to a housing 110. A packaging flap 120 is also attached to the housing 110, and will be used to secure the airbag cushion 101 inside the housing 110 after the airbag cushion 101 has been completely folded into the housing 110, as described hereinafter. Airbag cushion 101 is defined by an upper panel 130 and a lower panel 140, which are attached to one another along the periphery of airbag cushion 101.

Figure 2:
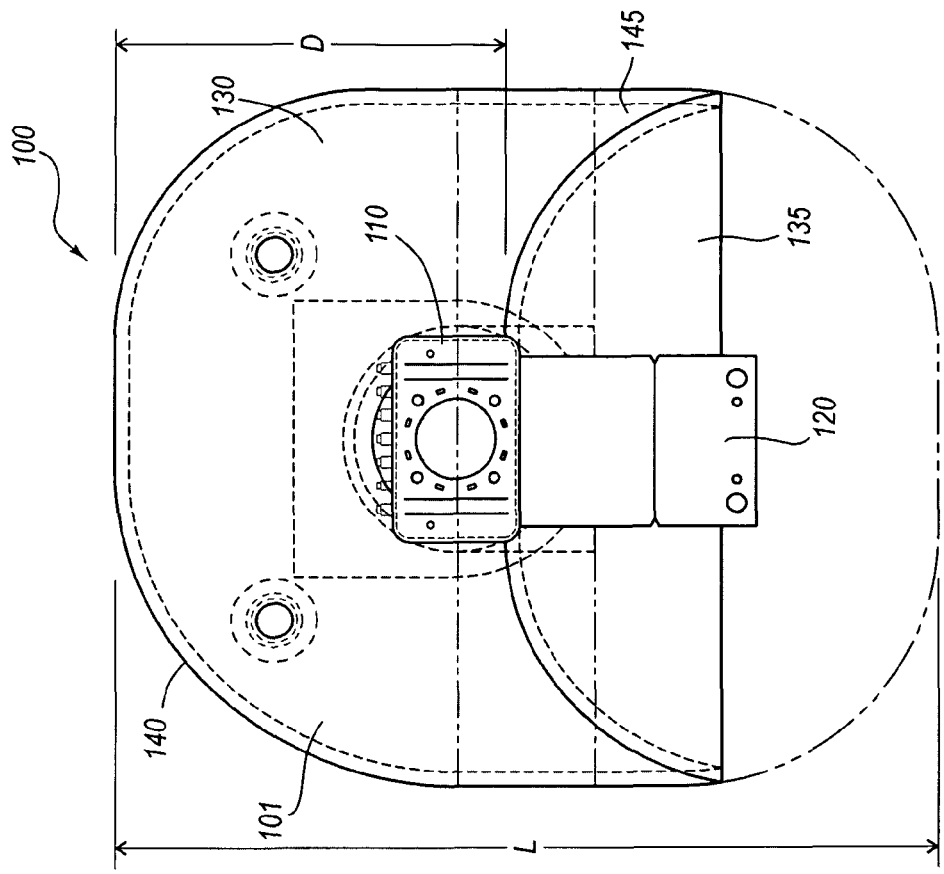
FIG. 2 is a top plan view of the airbag cushion assembly after a tucking step has been performed.

In one implementation of a method according to the invention, the airbag cushion 101 is tucked into itself, "outside-in" at one end. In other words, a first portion of the airbag cushion is tucked into a second portion of the airbag cushion such that the upper and lower panels of the first portion are positioned in between the upper and lower panels of the second portion. FIG. 2 depicts airbag cushion 101 after performance of this "tucking" step. The upper and lower panels of the first portion are referenced jointly at 135 and are both positioned in between the upper and lower panels of the second portion, which are referenced jointly at 145.

As can be seen in FIG. 2, the first portion of the airbag cushion has been tucked into the second portion of the airbag cushion to a distance of about fifty percent of the length of the airbag cushion prior to the tucking step. Otherwise stated, distance D is about one-half of distance L. In some implementations of the inventive method, such as is shown in the accompanying figures, the first portion of the airbag cushion is tucked into the second portion of the airbag cushion to a distance of at least about twenty percent of the length of the airbag cushion prior to the tucking step. In some such implementations, the first portion of the airbag cushion is tucked into the second portion of the airbag cushion to a distance of between about twenty percent and about fifty percent of the length of the airbag cushion prior to the tucking step.

After tucking a portion of the airbag cushion into itself, optionally, a light tack stitch or tear stitch may be applied to two or more of the tucked layers of the airbag cushion in order to help maintain the tuck during further folding and handling of the airbag cushion. The light stitching applied to the tucked portion of the airbag cushion may be positioned in a center portion of the cushion. Moreover, it may be desirable in some embodiments to extend the stitching across no more than one-half of the total width of the cushion. The stitching may be applied to two layers of the airbag cushion or more, up to the total number of layers in the tucked portion (four in the embodiment shown in the figures). The stitch count in one embodiment includes no more than 25 threads per 100 mm, thereby allowing the stitch to break away upon inflation of the airbag cushion without damaging the airbag cushion. Of course, those having skill in the art will appreciate that other thread counts may similarly provide for a stitch that will break away cleanly upon inflation without damaging the airbag cushion.

After tucking the airbag cushion 101 into itself at one end and, optionally, applying a light stitch to the tucked portion of the airbag cushion 101, the tucked portion is folded in towards the housing 110. In the implementation shown in the drawings, the tucked portion is folded multiple times until one side of the folded tucked portion is at least approximately even with a first side 112 of the housing 110. Note that the housing need not have a rectangular cross section as does housing 110 in the accompanying figures. Thus, the term "side" is intended to encompass portions of the housing that may not be straight. For example, in embodiments having a housing with a circular cross-section, folding the tucked portion until one side is at least approximately even with a first side of the housing may refer to folding the tucked portion until one side of the folded tucked portion is approximately tangent to a portion of the housing.

FIG. 3 depicts the airbag cushion 101 after a first fold has been applied to the tucked portion. FIGS. 4A and 4B depict the airbag cushion 101 after the tucked portion has been folded multiple times until one side of the folded tucked portion is at least approximately even with a first side 112 of the housing 110. In other implementations of the method, the tucked portion may be rolled towards the housing instead of folded multiple times. The meaning of the word "fold" should therefore encompass rolling as well as more conventional "folding" as shown in FIGS. 3 and 4A-4B. As discussed in greater detail below, the term "fold" should further encompass "accordion" folding. Of course, "folding" could also comprise a combination of one or more of the above-described "folds". For example, "folding" the tucked portion until one side of the folded tucked portion is at least approximately even with a first side of the housing could comprise one or more traditional folds followed by rolling the tucked portion to the housing.

As shown in FIGS. 5-6, optionally airbag cushion assembly 100 (including the housing 110) may be flipped over, as shown in FIG. 5, and then the folded portion rolled or otherwise folded over the housing opening such that at least a portion of the folded portion is positioned above the housing opening, as shown in FIG. 6. In FIGS. 4A-5, the tucked portion has been folded multiple times until one side of the folded tucked portion is at least approximately even with a first side 112 of the housing 110 and has been folded as such so that the remainder of the folded tucked portion of the airbag cushion 101 extends away from the housing. However, in the depicted implementation, after the steps discussed with reference to FIGS. 5-6 have been performed, the folded tucked portion of the airbag cushion 101 still has one side approximately even with first side 112 of housing 110, but is now positioned such that the remainder of the folded tucked portion extends towards the direction of the housing 110. A portion of the folded airbag cushion 101 may also be tucked into the housing at this time if desired.

After the tucked portion has been folded up to the housing, a first half 102 and a second half 104 of the airbag cushion 101 are folded in towards the housing 110. As can be seen in FIGS. 7A-8B, first half 102 of the airbag cushion 101 includes approximately half of the tucked portion and second half 104 includes the other half of the tucked portion. In the implementation shown in the drawings, first half 102 is folded until a first side 152 of the folded first half 102 of the airbag cushion is approximately even with a second side 114 of the housing 110. A second side 154 of the folded first half 102 of the airbag cushion, opposite from first side 152, is approximately aligned with the center of the housing 110, as shown in FIGS. 7A-7B.

As best seen in FIG. 7B, in the depicted implementation, first half 102 has been folded in towards housing 110 with an "accordion" fold. In other words, the folds alternate in direction such that the folded sections can be stacked on one another. Of course, other folding options are available. For instance, first half 102 may be folded multiple times in the same direction instead of back and forth as in accordion folding. Alternatively, first half 102 may be simply rolled in towards the housing 110. As previously discussed, each of the aforementioned steps should be considered within the scope of the term "fold".

As shown in FIGS. 8A-8C, second half 104 may be folded in towards housing 110 in a similar manner. Specifically, second half 104 is folded until a first side 156 of the folded second half 104 is approximately even with a third side 116 of the housing 110. A second side 158 of the folded second half 104, opposite from first side 156, is approximately aligned with the center of the housing 110.

Figure 10:
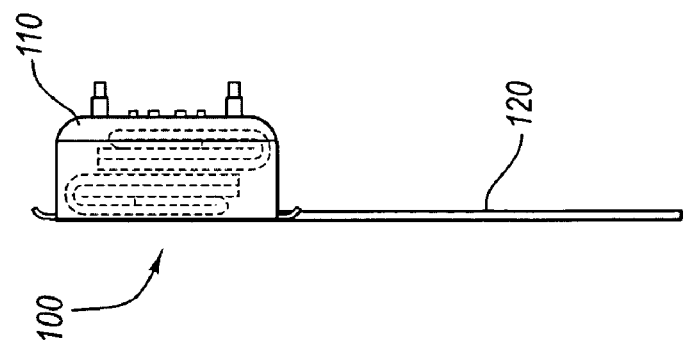
FIG. 10 is a side elevation view of the airbag cushion assembly after the airbag cushion has been folded and tucked into the housing.
Figure 9:
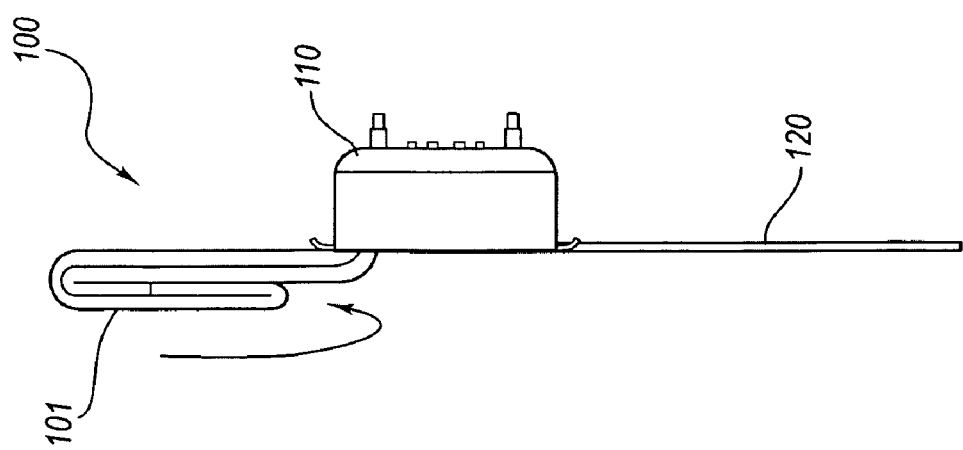
FIG. 9 is a side elevation view of the airbag cushion assembly after the airbag cushion has been partially folded towards the housing.

After first half 102 and second half 104 have been folded in towards the housing 110, the folded first and second halves of the airbag cushion may be folded again, this time together, in the same direction, and down into the housing 110. As shown in FIGS. 9 and 10, the remainder of the airbag cushion 101, which includes folded first half 102 and folded second half 104, is folded (e.g., folded end-over-end, accordion folded, or rolled) into housing 110. Packaging flap 120 may then be wrapped around the assembly and secured.

Certain implementations of the inventive method can be used to produce an airbag assembly with desirable inflation characteristics. For instance, in many of the above-described embodiments, the folding method employed causes the top of the airbag cushion to deploy first, followed by the sides. The bottom of the airbag cushion will typically be the last portion to inflate, due to the tuck, which holds the bottom portion inside the housing until the top and sides have been inflated. This may be a desirable inflation scenario for some applications.

Application of a light stitching to the tucked portion, as described in detail above, may further enhance certain desirable inflation characteristics. For example, the stitching may allow for further delay of expansion of the bottom portion. The timing of the delay may also be tuned by altering the strength and position of the stitching. Moreover, in embodiments in which the stitching is positioned in a center portion of the cushion, the unstitched sides of the airbag cushion may tend to inflate first, thereby causing the stitch to fail from the sides towards the center. Thus, the stitching and folding methods described herein may be used to provide a variety of different inflation characteristics as desired.

Figure 11:
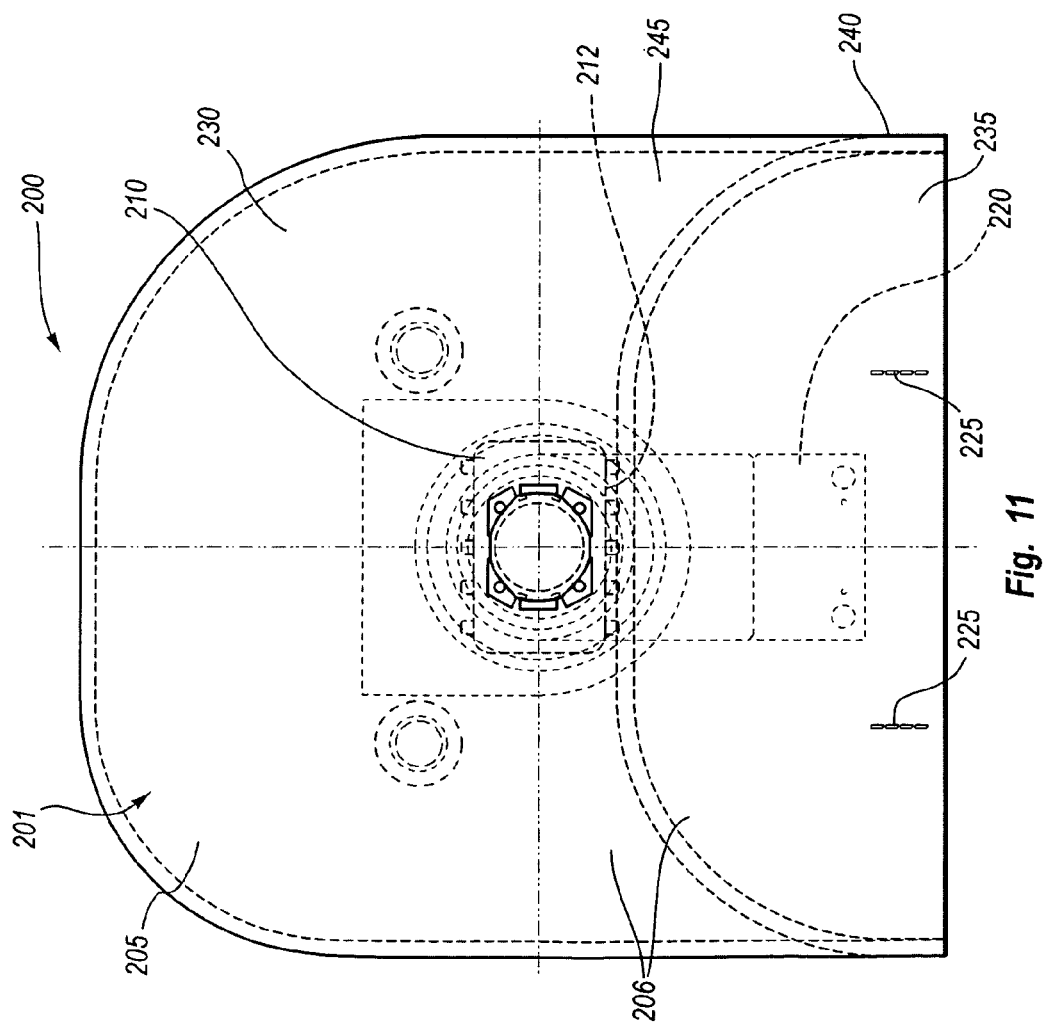
FIG. 11 is a top plan view of another airbag cushion assembly after a tucking step of a method for folding an airbag cushion has been performed.

FIG. 11 depicts another inflatable airbag cushion assembly from a top view. Airbag assembly 200 may be configured similarly and may be configured to function similarly as airbag cushion assembly 100, described herein. Inflatable airbag cushion assembly 200 may be employed in a method for folding an inflatable cushion membrane, wherein the method results in a packaged cushion membrane that deploys with predetermined characteristics. For example, a passenger or airbag cushion packaged according to methods described herein may exhibit an "instrument panel hugging" behavior during airbag cushion membrane deployment, wherein the airbag remains in close proximity to an instrument panel in a vehicle.

An airbag cushion membrane that displays an instrument panel hugging behavior may comprise deployment characteristics wherein a bottom portion of the airbag cushion membrane have a deployment trajectory that is significantly rearward and downward compared to cushion membranes that do not exhibit a hugging behavior during deployment.

As can be seen in FIG. 11, airbag assembly 200 may comprise a cushion membrane 201, a housing 210, and a flap 220. Cushion membrane 201 may comprise an upper portion 205, a lower portion 206, an upper or front panel 230, a lower or rear panel 240, and a housing 210. Lower portion 206 of cushion 201 may further be described as having a first portion 235 and a second portion 245, wherein each of the upper and lower portions comprise a front panel and a rear panel.

In the depiction of FIG. 11, first portion 235 of the lower portion 206 has been tucked into second portion 245 to a distance of about fifty percent of the length of the airbag cushion prior to the tucking step. In other words, lower portion 206 has been tucked into itself. In some implementations of the inventive method, such as is shown in the accompanying figures, the first portion of the airbag cushion is tucked into the second portion of the airbag cushion to a distance of at least about twenty percent of the length of the airbag cushion prior to the tucking step. In some such implementations, the first portion of the airbag cushion is tucked into the second portion of the airbag cushion to a distance of between about twenty percent and about fifty percent of the length of the airbag cushion prior to the tucking step. In another embodiment, the first portion is tucked until a bottom edge of the first portion is approximately centered over the housing.

After tucking a portion of the airbag cushion into itself, optionally, a light tack stitch or tear stitch 225 may be applied to two or more of the tucked layers of the airbag cushion in order to help maintain the tuck during further folding and handling of the airbag cushion. The light stitching applied to the tucked portion of the airbag cushion may be positioned in a center portion of the cushion. Moreover, it may be desirable in some embodiments to extend the stitching across no more than one-half of the total width of the cushion. The stitching may be applied to two layers of the airbag cushion or more, up to the total number of layers in the tucked portion (four in the embodiment shown in the figures). The stitch count in one embodiment includes no more than 25 threads per 100 mm, thereby allowing the stitch to break away upon inflation of the airbag cushion without damaging the airbag cushion. Of course, those having skill in the art will appreciate that other thread counts may similarly provide for a stitch that will break away cleanly upon inflation without damaging the airbag cushion.

Figure 12A:
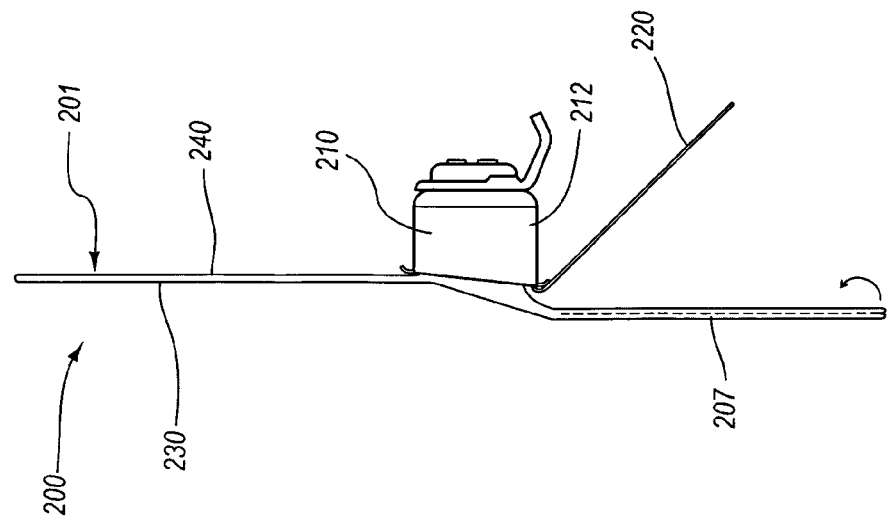
FIG. 12A is a side elevation view of the airbag cushion assembly of FIG. 11.
Figure 12D:
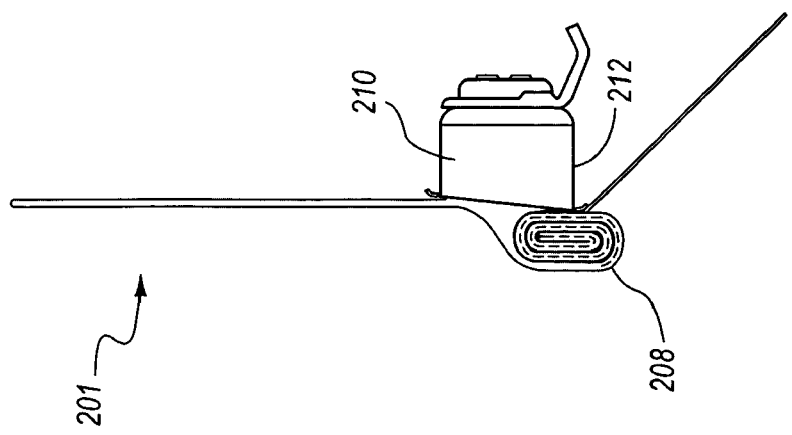
FIG. 12D is a side elevation view of the airbag cushion assembly of FIG. 12C after a portion of the airbag cushion has been rolled.
Figure 12C:
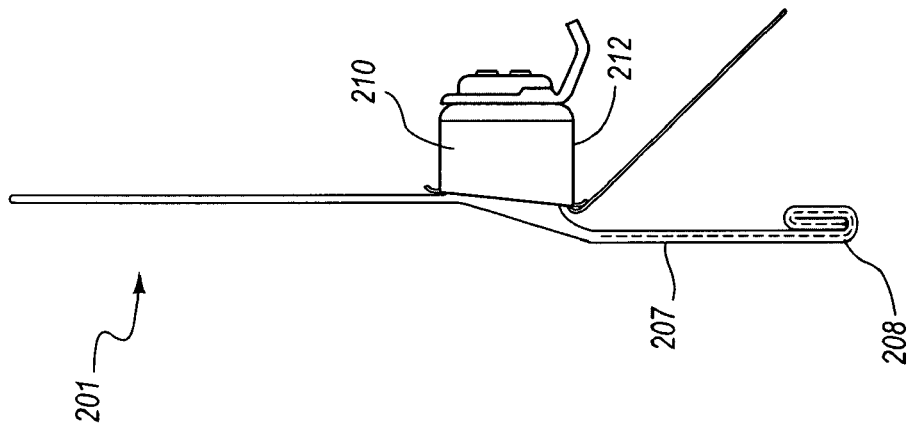
FIG. 12C is a side elevation view of the airbag cushion assembly of FIG. 12B, wherein a portion of the airbag cushion has been partially rolled.
Figure 12B:
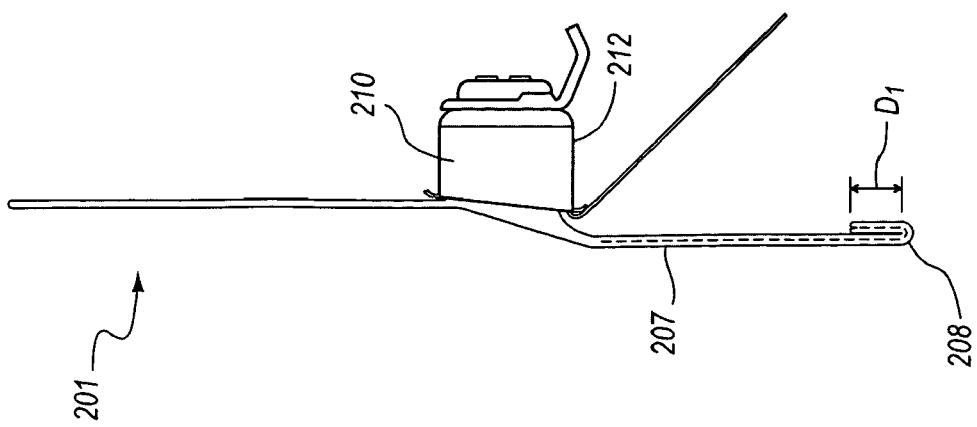
FIG. 12B is a side elevation view of the airbag cushion assembly of FIG. 12A depicting a step of the method for folding an airbag cushion.

FIGS. 12A-12D are side elevation views of a next step in a method for packing an airbag cushion, wherein upper or front panel 230, lower or rear panel 240, and packaging flap 220 are more readily apparent. After tucking the airbag cushion 201 into itself at one end and, optionally, applying a light stitch 225 to the tucked portion of the airbag cushion 201, the tucked portion is folded in towards the housing 210 as depicted in FIG. 12A. In the implementation shown in the drawings, the tucked portion is reverse rolled multiple times until one side of the rolled tucked portion 208 is at least approximately even with a first side 212 of the housing 210. A reverse roll may be distinguished by a forward roll in that a reverse roll is begun by folding or rolling the airbag cushion membrane in the direction of a rear panel such as real panel 240. As depicted in FIG. 12C, the reverse roll may begin with a roll or fold of a predetermined distance $D_1$. In one embodiment, $D_1$ is about 50 mm.

Note that the housing need not have a rectangular cross section as does housing 210 in the accompanying figures. Thus, the term "side" is intended to encompass portions of the housing that may not be straight. For example, in embodiments having a housing with a circular cross-section, folding the tucked portion until one side is at least approximately even with a first side of the housing may refer to folding the tucked portion until one side of the rolled tucked portion 208 is approximately tangent to a portion of the housing.

FIG. 12D depicts the airbag cushion 201 after a first fold has been applied to the tucked portion. FIG. 12D depicts the airbag cushion 201 after the tucked portion has been folded multiple times until one side of the folded tucked portion is at least approximately even with a first side 212 of the housing 210. As noted above, the meaning of the word "fold" should therefore encompass rolling as well as more conventional "folding" as shown in FIGS. 12A-D. As discussed in greater detail below, the term "fold" should further encompass "accordion" folding. Of course, "folding" could also comprise a combination of one or more of the above-described "folds". For example, "folding" the tucked portion until one side of the folded tucked portion is at least approximately even with a first side of the housing could comprise one or more traditional folds followed by rolling the tucked portion to the housing.

FIG. 13 depicts assembly 200 from a top plan view after the lower portion of cushion 201 has been tucked and rolled 208. Upper portion 205 and tucked and rolled lower portion 208 can be said to comprise two halves of cushion 201, a first half 202, and a second half 204. Also visible in this view are first, second and third sides 212, 214, and 216 of housing 210.

FIGS. 14A-14C depict a next step in a method for packaging an inflatable cushion in which housing 210 first, second, and third sides 212, 214, and 216 are visible, as well as first and second halves 202 and 204 of cushion 201. FIG. 14A is a front elevation view of cushion assembly 200 as depicted in the top plan view of the assembly in FIG. 13. As depicted in FIG. 14B, this step of the method is accomplished by reverse rolling the first and second halves 202 and 204 in toward second and third sides 214 and 216 of housing 210. The reverse rolls may begin by initially folding or rolling a portion of the cushion having a predetermined length, $D_2$. In one embodiment, $D_2$ comprises 30 mm. Halves 202 and 204 are rolled until a first side 252 of the rolled first half of cushion is approximately even with third side 252 of housing 210, as seen in FIG. 14C. The width of the rolled portion is predetermined such that a second side 254 of rolled first half of the cushion is approximately centered over housing 201. Likewise, second half 204 is rolled, wherein the width of the roll is predetermined such that first and second sides 256 and 258 of the rolled second half of the cushion are approximately even with a second side 214 and middle of housing 210, respectively.

FIG. 14C depicts the bottom portion of the cushion after several steps including tucking the bottom portion of the cushion, reverse rolling the bottom portion toward first housing side 212, and then reverse rolling the two halves of the tucked and rolled bottom portion toward second and third sides 214 and 216 of the housing. As such, the tucked, rolled and further rolled bottom portion of the cushion 209 is visible. FIG. 14C does not depict the upper portion of the cushion; however, FIG. 15 does.

Figure 15:
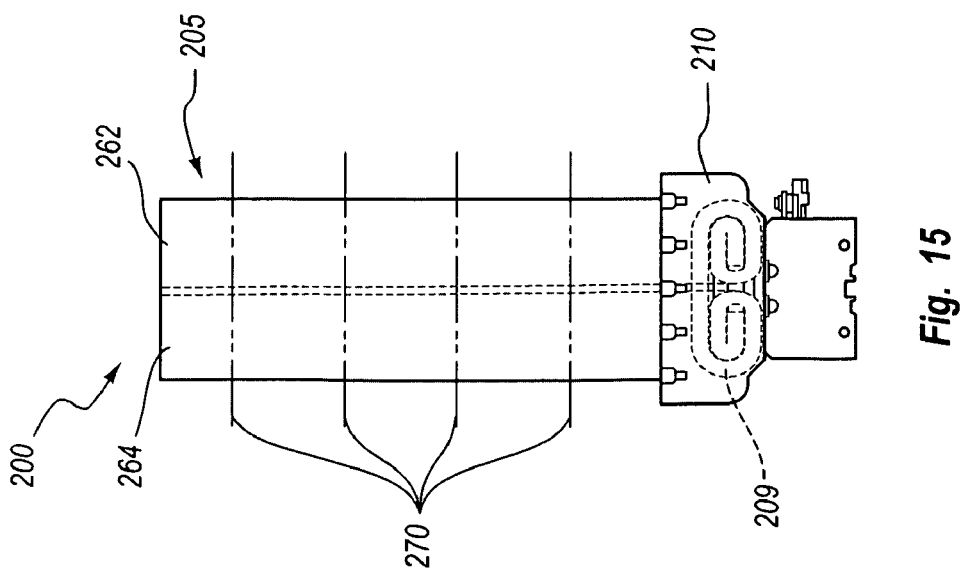
FIG. 15 is a front elevation view of the airbag cushion of assembly of FIG. 14C after the rolled portion has been placed in a housing.

FIG. 15 is a front elevation view of assembly 200 after the tucked, rolled, and rolled lower portion 209 has been placed within housing 210. In the view of FIG. 15, the upper portion 205 is visible, wherein the halves of the upper portion have been rolled, such that the upper portion comprises rolled first and second halves 262 and 264. Also depicted are fold lines 270 of a predetermined distance, along which rolled first and second halves 262 and 264 will be folded, as depicted in FIGS. 16A-16C.

Figure 16C:
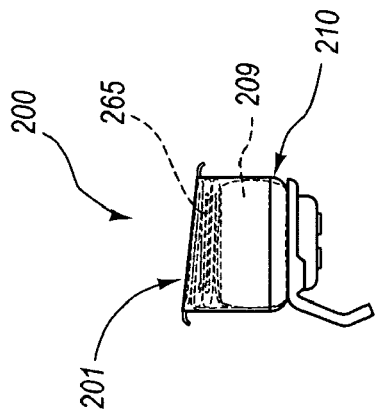
FIG. 16C is a side elevation view of the airbag cushion of assembly of FIG. 16B after the airbag cushion has been manipulated into a packaged configuration.
Figure 16A:
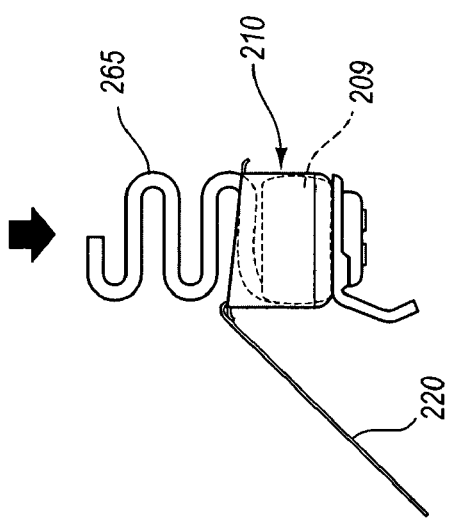
FIG. 16A is a side elevation view of the airbag cushion of assembly of FIG. 15 in which another step of a method for folding an airbag cushion is being performed.
Figure 16B:
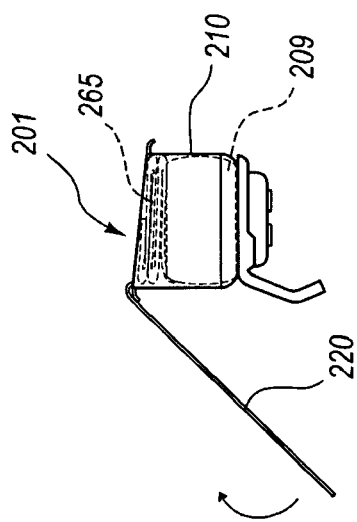
FIG. 16B is a side elevation view of the airbag cushion of assembly of FIG. 16A after the airbag cushion has been folded and placed in the housing.

FIGS. 16A-16C are side elevation views that depict other steps in a method for packaging an inflatable cushion. FIG. 16A is comparable to FIG. 15 in that the airbag assembly has been turned approximately 90 degrees and the upper portion of the cushion has been partially folded. In a next step, the rolled first and second halves 265 of the upper portion of the airbag cushion are accordion folded together and placed on top of tucked, rolled, and further rolled lower portion 209 within housing 210. Flap 220 may then be at least partially wrapped around the packaged cushion membrane 201, as depicted in FIG. 16B. The flap may comprise a packaging flap, a deployment flap, or a combination of a packaging flap and a deployment flap. Further, the flap may be attached to the outside of housing 210 on one end or both ends, only one end, or neither end.

Figure 17:
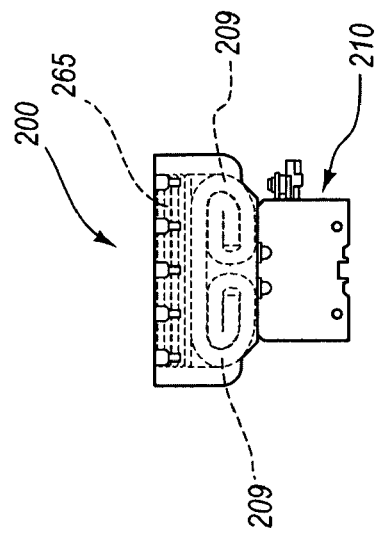
FIG. 17 is a front elevation view of the airbag assembly of FIG. 16C.

FIG. 16C depicts assembly 200 after cushion 201 has been packaged and placed within housing 210. The tucked, rolled, and further rolled lower portion 209 is adjacent a base portion of housing 210 and the rolled and folded first and second halves 265 have been placed on top of portion 209. The flap is not visible in this view, but may wrap cushion 201. A cosmetic cover may be fitted over the top of housing 210. FIG. 17 depicts the packaged assembly 200 from a front elevation view, wherein tucked, rolled, and further rolled lower portion 209 is visible, as are the rolled and folded first and second halves 265.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims.

The invention claimed is:

1. A method for folding an airbag cushion into a housing, comprising:
    obtaining an airbag cushion defined by an upper panel and a lower panel, wherein the airbag cushion is attached to a housing;
    tucking a first portion of the airbag cushion into a second portion of the airbag cushion such that the upper and lower panels of the first portion are positioned in between the upper and lower panels of the second portion;
    directly stitching at least two adjacent layers of the tucked portion of the airbag cushion together, wherein the step of directly stitching is performed after the step of tucking a first portion of the airbag cushion into a second portion of the airbag cushion;
    reverse rolling the tucked portion in towards the housing;
    accordion folding a first half of the airbag cushion in towards the housing, wherein the first half of the airbag cushion includes approximately half of the tucked portion;
    accordion folding a second half of the airbag cushion in towards the housing, wherein the second half of the airbag cushion includes approximately half of the tucked portion; and
    accordion folding each of the accordion folded first and second halves of the airbag cushion into the housing.

2. The method of claim 1, wherein a stitch placed in the tucked portion extends through each of the layers of the tucked portion.

3. The method of claim 1, wherein the step of reverse rolling the tucked portion in towards the housing further comprises reverse rolling the tucked portion until one side of the folded tucked portion is at least approximately even with a first side of the housing.

4. The method of claim 1, wherein the step of accordion folding a first half of the airbag cushion is performed by accordion folding the first half of the airbag cushion until a first side of the accordion folded first half of the airbag cushion is at least approximately even with a second side of the housing, wherein the step of accordion folding a second half of the airbag cushion is performed by accordion folding the second half of the airbag cushion until a first side of the accordion folded second half of the airbag cushion is at least approximately even with a third side of the housing, and wherein the steps of accordion folding the first and second halves of the airbag cushion are performed after the steps of tucking a first portion of the airbag cushion and reverse rolling the tucked portion.

5. The method of claim 4, wherein, following the step of accordion folding a first half of the airbag cushion, a second side of the accordion folded first half of the airbag cushion opposite from the first side is approximately aligned with the center of the housing.

6. The method of claim 4, wherein a stitch placed in the tucked portion extends through each of the layers of the tucked portion.

7. The method of claim 4, wherein a stitch placed in the tucked portion is a light stitch so as to allow the stitch to break away upon inflation of the airbag cushion without damaging the airbag cushion.

8. The method of claim 4, wherein the step of stitching the tucked portion is performed before any of the folding steps.

9. The method of claim 4, wherein a stitch placed in the tucked portion extends across no more than about half of the total width of the airbag cushion.

10. The method of claim 9, wherein the stitch placed in the tucked portion is positioned in a center portion of the cushion such that, upon inflation, the unstitched sides of the airbag cushion inflate first, thereby causing the stitch to fail from the sides towards the center.

11. The method of claim 4, wherein the first portion of the airbag cushion is tucked into the second portion of the airbag cushion to a distance of at least about twenty percent of the length of the airbag cushion prior to the tucking step.

12. A method for folding an airbag cushion into a housing, comprising:
  obtaining an airbag cushion defined by an upper panel and a lower panel, wherein the airbag cushion is attached to a housing;
  tucking a first portion of the airbag cushion into a second portion of the airbag cushion such that the upper and lower panels of the first portion are positioned in between the upper and lower panels of the second portion;
  directly joining at least two adjacent layers of the tucked portion of the airbag cushion together, wherein the step of directly joining at least two adjacent layers is performed after the step of tucking a first portion of the airbag cushion into a second portion of the airbag cushion;
  reverse rolling the tucked portion until one side of the folded tucked portion is at least approximately even with a first side of the housing;
  accordion folding a first half of the airbag cushion until a first side of the folded first half of the airbag cushion is at least approximately even with a second side of the housing, wherein the first half of the airbag cushion includes approximately half of the tucked portion, and wherein the step of folding a first half of the airbag cushion is performed after the steps of tucking a first portion of the airbag cushion and folding the tucked portion;
  accordion folding a second half of the airbag cushion until a first side of the folded second half of the airbag cushion is at least approximately even with a third side of the housing, wherein the second half of the airbag cushion includes approximately half of the tucked portion, and wherein the step of folding a second half of the airbag cushion is performed after the steps of tucking a first portion of the airbag cushion and folding the tucked portion; and
  accordion folding the folded first half and the folded second half of the airbag cushion into the housing.

13. The method of claim 12, wherein the step of joining at least two layers of the tucked portion of the airbag cushion together comprises stitching at least two layers of the tucked portion of the airbag cushion together.

14. The method of claim 12, wherein a stitch placed in the tucked portion extends through each of the layers of the tucked portion.

15. The method of claim 12, wherein a stitch placed in the tucked portion is a light stitch so as to allow the stitch to break away upon inflation of the airbag cushion without damaging the airbag cushion.

16. The method of claim 12, wherein the step of stitching the tucked portion is performed before any of the folding steps.

17. The method of claim 12, wherein a stitch placed in the tucked portion extends across no more than about half of the total width of the airbag cushion.

18. The method of claim 17, wherein the stitch placed in the tucked portion is positioned in a center portion of the cushion such that, upon inflation, the unstitched sides of the airbag cushion inflate first, thereby causing the stitch to fail from the sides towards the center.

19. The method of claim 12, wherein, following the step of accordion folding a first half of the airbag cushion, a second side of the accordion folded first half of the airbag cushion opposite from the first side is approximately aligned with the center of the housing.

20. The method of claim 12, wherein, following the step of accordion folding a second half of the airbag cushion, a second side of the accordion folded second half of the airbag cushion opposite from the first side is approximately aligned with the center of the housing.

21. The method of claim 12, wherein the first portion of the airbag cushion is tucked into the second portion of the airbag cushion to a distance of at least about twenty percent of the length of the airbag cushion prior to the tucking step.

22. An airbag cushion assembly, comprising an airbag cushion folded into a housing in accordance with the method of claim 12.

* * * * *